(12) United States Patent
Kaml et al.

(10) Patent No.: US 12,638,638 B2
(45) Date of Patent: May 26, 2026

(54) FIBER OPTIC SPLICE TRANSITIONS AND METHODS OF ASSEMBLY

(71) Applicant: CommScope Technologies LLC, Hickory, NC (US)

(72) Inventors: Jonathan R. Kaml, Shakopee, MN (US); Scott L. Carlson, Bloomington, MN (US)

(73) Assignee: CommScope Technologies LLC, Claremont, NC (US)

( * ) Notice: Subject to any disclaimer, the term of this patent is extended or adjusted under 35 U.S.C. 154(b) by 256 days.

(21) Appl. No.: 18/004,356

(22) PCT Filed: Jul. 7, 2021

(86) PCT No.: PCT/US2021/040698
§ 371 (c)(1),
(2) Date: Jan. 5, 2023

(87) PCT Pub. No.: WO2022/011019
PCT Pub. Date: Jan. 13, 2022

(65) Prior Publication Data
US 2023/0358987 A1      Nov. 9, 2023

Related U.S. Application Data

(60) Provisional application No. 63/048,954, filed on Jul. 7, 2020.

(51) Int. Cl.
| | |
|---|---|
| *G02B 6/255* | (2006.01) |
| *B29C 45/14* | (2006.01) |
| *G02B 6/44* | (2006.01) |

(52) U.S. Cl.
CPC ...... *G02B 6/2558* (2013.01); *B29C 45/14065* (2013.01); *G02B 6/255* (2013.01);
(Continued)

(58) Field of Classification Search
CPC .. G02B 6/2558; G02B 6/3849; G02B 6/2551; G02B 6/4472; G02B 6/4475;
(Continued)

(56) References Cited

U.S. PATENT DOCUMENTS

| | | | |
|---|---|---|---|
| 6,856,748 B1 * | 2/2005 | Elkins, II | G02B 6/44465 385/100 |
| 8,573,855 B2 * | 11/2013 | Nhep | G02B 6/4472 385/86 |

(Continued)

OTHER PUBLICATIONS

International Search Report International Patent Application No. PCT/US2021/040698 mailed Oct. 27, 2021.

*Primary Examiner* — Eric Wong
(74) *Attorney, Agent, or Firm* — Merchant & Gould P.C.

(57) ABSTRACT

The present disclosure relates to a fiber optic cable breakout assembly that includes a transition body made from a moldable material having an inlet end and an opposite outlet end. The moldable transition body includes a centering element positioned therein and an internal splice positioned within the centering element to splice a plurality of breakout fibers to at least one cable. The centering element is configured to center the splice, the at least one cable and the plurality of breakout fibers prior to molding the transition body. The transition body is adapted to protect the splice and fibers such that no other external protection is needed.

7 Claims, 20 Drawing Sheets

(52) U.S. Cl.
　　CPC ....... *G02B 6/2555* (2013.01); *G02B 6/44715*
　　　　(2023.05); *G02B 6/4479* (2013.01)

(58) Field of Classification Search
　　CPC .... G02B 6/4453; G02B 6/3825; B29C 45/34;
　　　　　　　　　　　　　　　　B29C 45/14065
　　See application file for complete search history.

(56) References Cited

U.S. PATENT DOCUMENTS

| | | | |
|---|---|---|---|
| 8,705,930 | B2 | 4/2014 | Lu et al. |
| 9,395,509 | B2 | 7/2016 | Petersen et al. |
| 9,500,830 | B2 | 11/2016 | Lu et al. |
| 10,914,909 | B2 | 2/2021 | Wentworth et al. |
| 11,131,821 | B2 | 9/2021 | Petersen et al. |
| 11,131,822 | B2 | 9/2021 | Lockhart et al. |
| 11,360,264 | B2 | 6/2022 | Trnka et al. |
| 11,480,751 | B2 | 10/2022 | Ott |
| 11,681,102 | B2 | 6/2023 | Carlson et al. |
| 11,906,782 | B2 | 2/2024 | Petersen et al. |
| 11,947,165 | B2 | 4/2024 | Petersen et al. |
| 2006/0093278 | A1* | 5/2006 | Elkins, II ............. G02B 6/4473 |
| | | | 385/86 |
| 2006/0233507 | A1* | 10/2006 | Makrides-Saravanos ................... |
| | | | G02B 6/4453 |
| | | | 385/135 |
| 2008/0080818 | A1 | 4/2008 | Cobb, III et al. |
| 2009/0166924 | A1* | 7/2009 | Kuttappa ................ B29C 39/10 |
| | | | 264/277 |
| 2009/0260736 | A1* | 10/2009 | Charette ........... B29C 45/14065 |
| | | | 156/49 |
| 2011/0317975 | A1 | 12/2011 | Ku et al. |
| 2015/0000103 | A1 | 1/2015 | Mcavoy et al. |
| 2015/0253503 | A1 | 9/2015 | Saito et al. |
| 2016/0052183 | A1* | 2/2016 | Esseghir ................. B29C 45/34 |
| | | | 425/504 |
| 2016/0318267 | A1* | 11/2016 | Koiso ................. B29C 45/1753 |
| 2019/0154940 | A1 | 5/2019 | Kowalczyk et al. |
| 2020/0371308 | A1* | 11/2020 | Finnegan ............. G02B 6/4472 |
| 2020/0400233 | A1* | 12/2020 | Hrones ............. B29C 45/14065 |

\* cited by examiner

FIBER OPTIC SPLICE TRANSITIONS AND METHODS OF ASSEMBLY

CROSS-REFERENCE TO RELATED APPLICATION

This application is being filed as a National Stage Application of PCT International Patent Application PCT/US2021/040698, filed on 7 Jul. 2021, and claims the benefit of U.S. Patent Application Ser. No. 63/048,954, filed on Jul. 7, 2020, the disclosures of which are incorporated herein by reference in their entireties.

FIELD OF THE INVENTION

This disclosure relates to cable breakout assemblies, components thereof, and methods of assembly.

BACKGROUND

A cable fanout or breakout assembly transitions from a cable including a jacket around multiple optical fibers to breakouts of individual optical fibers or groups of optical fibers. Further improvements in this area are desired.

SUMMARY

The present disclosure is directed to an assemblies and methods for organization and management of optical fibers in a fiber optic cable breakout assembly. The breakout assembly includes an internal splice that splices pigtails or other cables to a main cable.

The fiber optic cable breakout assembly can include a transition body formed by a moldable material.

Molding parts form an enclosed molding area which can be filled with a moldable material, for forming the transition body.

A centering device can be positioned in the molding parts to form part of the transition body. The centering device centers the fibers and the splice within the molding parts in preparation of adding the moldable material to form the transition body around the fibers and the splice for protection.

In certain examples, no other external protection is needed around the transition body after the molding parts are removed.

The transition body can include a strain relief boot on one end and a cable organizing end cap on an opposite end.

In certain examples, the moldable material of the transition body has a generally constant cylindrical shape with a generally constant outer diameter from one end adjacent to a strain relief boot to an opposite end adjacent to a cable organizing end cap.

Another aspect of the present disclosure relates to a method of making a fiber optic cable breakout assembly. The method can include providing a mold which allows the at least one cable and the plurality of breakout fibers to pass therethrough; inserting a centering device and a splice into the mold; and filling the mold with a moldable material to surround the centering device, the internal splice, and the plurality of breakout fibers passing through the transition body.

In certain examples, the method can also include a step of passing the plurality of breakout fibers through a plurality of breakout tubings.

In certain examples, the method can include a step of orienting the mold in a vertical orientation prior to inserting the moldable, and filling the mold from a lower location toward an upper location, the upper location including a moldable material reservoir.

In certain examples, the breakout assembly includes one cable to six pigtails or one cable to twelve pigtails, although many alternatives are possible.

DETAILED DESCRIPTION

A fiber optic cable typically includes a plurality of optical fibers. In some instances, fibers of the cable need to be accessed and/or managed. An optical fiber fanout or break-out assembly is used to manage the fibers by fanning out the fibers into useable subunits. The term "fanning out" as used herein, in this context, refers to a process of organizing the fibers, typically by aligning them as the fibers pass from one or more cables to one or more additional cables, tubes, conduits, or other devices.

Figure 1:
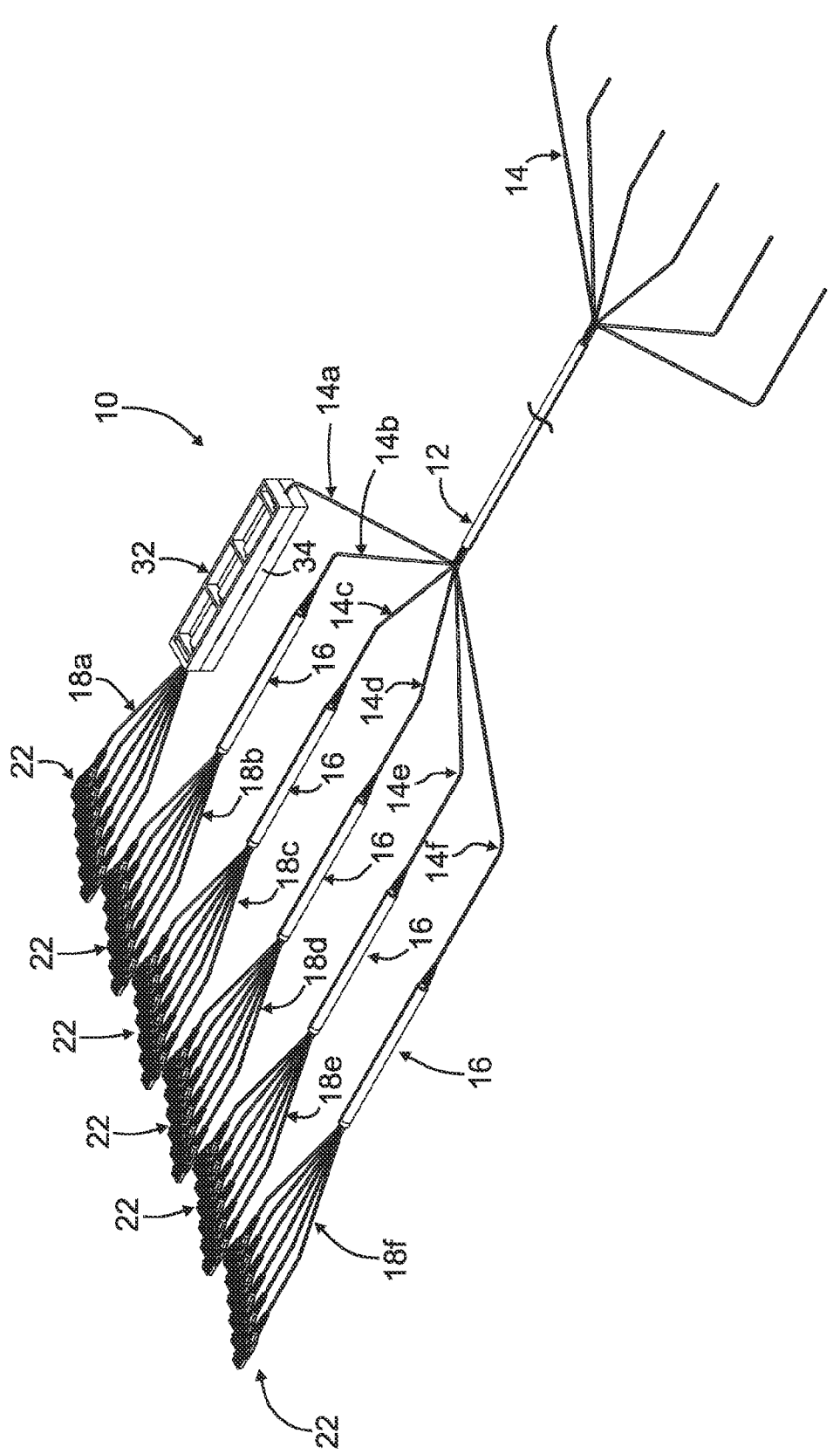
FIG. 1 is a first perspective view of one example embodiment of a cable assembly including a plurality of fiber breakout assemblies, and including an example molding part in accordance with principles of the present disclosure.
Figure 2:
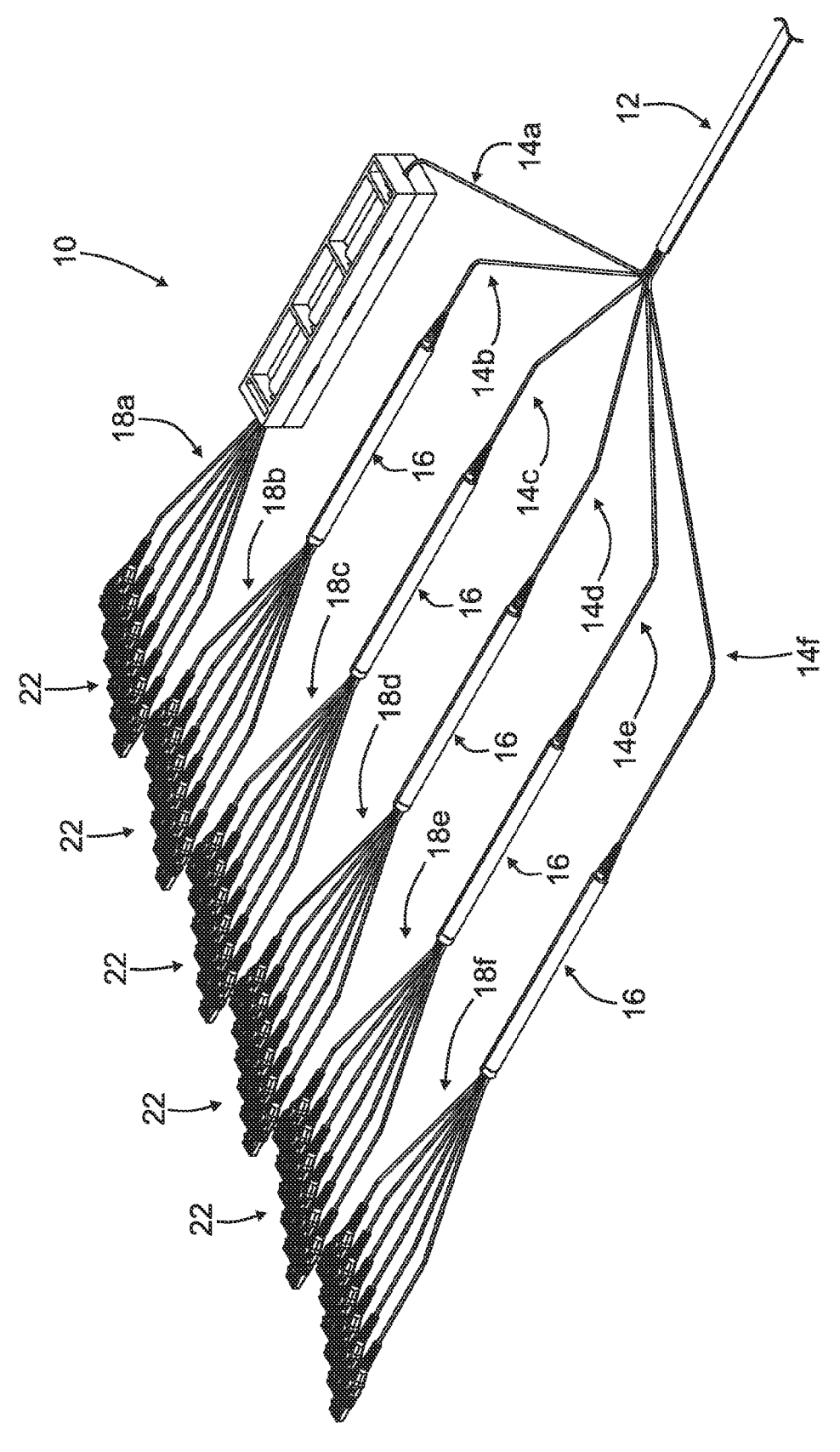
FIG. 2 is another perspective view of the cable assembly of FIG. 1.
Figure 3:
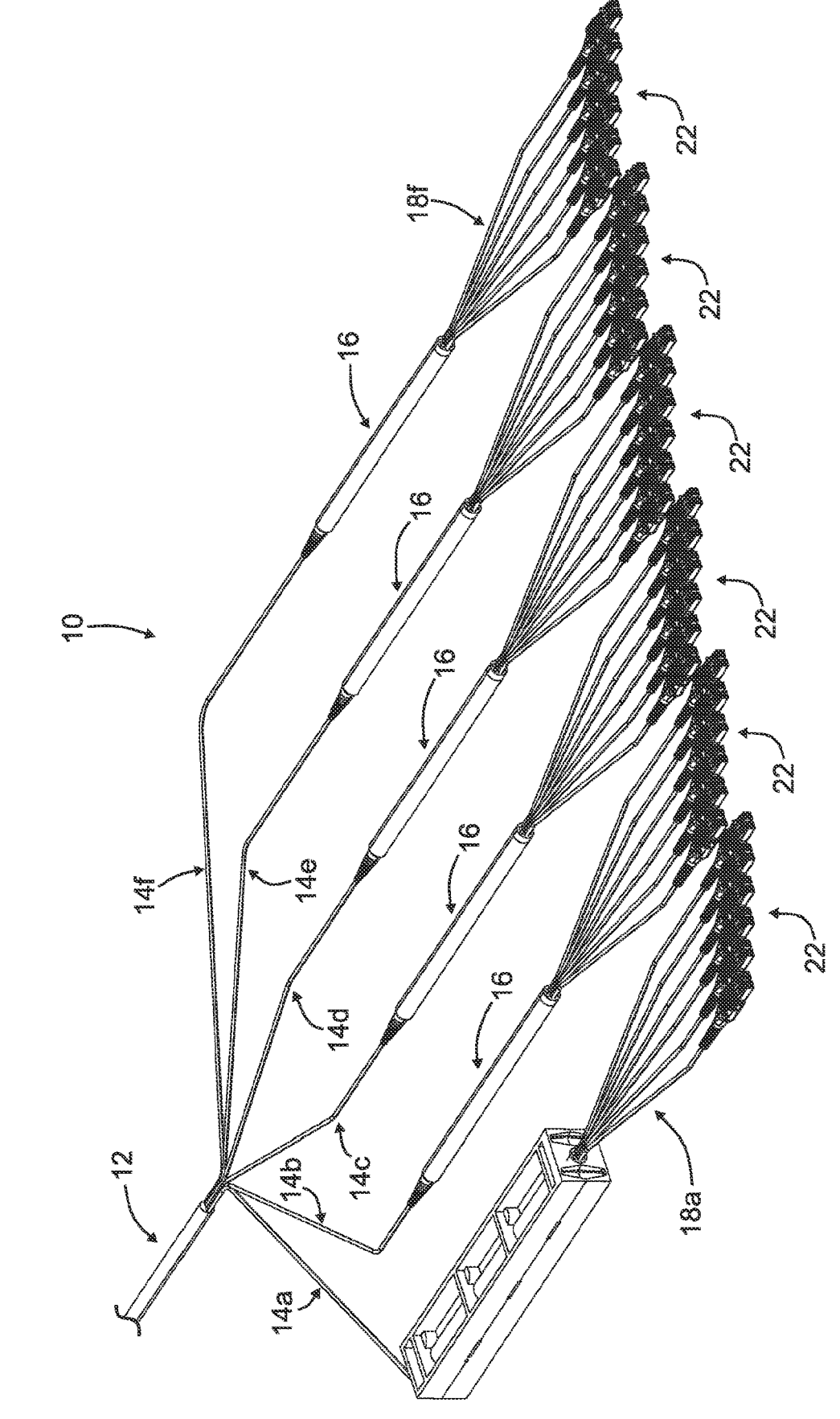
FIG. 3 is a perspective view of the opposite end the cable assembly also including a plurality of fiber breakout assemblies like that of FIGS. 1 and 2.

Referring now to the figures, a fiber optic cable breakout assembly is shown in FIGS. 1-3 and designated broadly at 10. The fiber optic cable breakout assembly 10 includes a main or trunk cable 12 (e.g., multi-fiber cables) that includes strength members, such as aramid yarn and at least one cable 14, although alternatives are possible. The trunk cable 12 can be fanned out or broken out in a desired manner within the fiber optic cable breakout assembly 10. In one example, the trunk cable 12 is broken out to six single fiber breakout cables 14*a-f*. In certain examples, the trunk cable 12 can be broken out to 24, 12, 8, 6, 4, or 2 cables. In some cases the trunk cable 12 may only include one cable 14.

Figure 4:
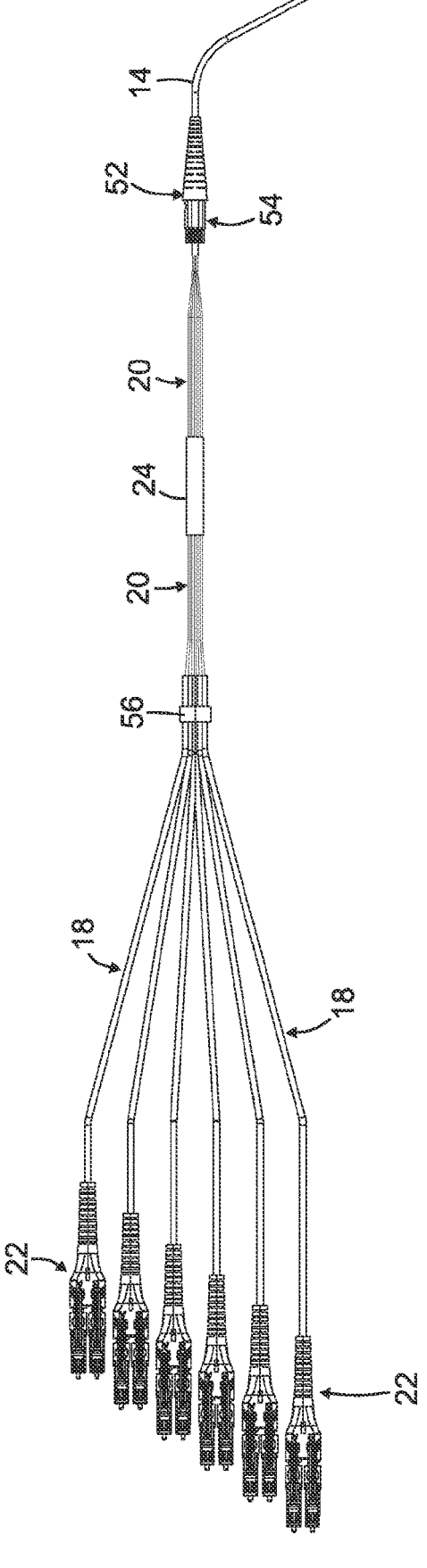
FIG. 4 is a perspective view of one of the fiber breakout assemblies of FIG. 1 showing the splice, optical fibers and six connectors.

The fiber optic cable breakout assembly 10 includes a breakout device or transition body 16 that separates out from the at least one cable 14 a plurality of breakout fibers 20 (see FIG. 4) that can pass through a plurality of breakout tubings 18. In this description, the terms cables, tubes, and conduits are generally interchangeable, and not meant to suggest differences in structure or function unless otherwise noted. The breakout tubings 18 may include strength members such as aramid yarn. The breakout tubings 18 and breakout fibers 20 may be terminated with fiber optic connectors 22. The breakout fibers 20 are spliced to the fibers of cables 14 *a-f*.

In certain examples, at least one fiber 20 is positioned within each breakout tubing 18. In the example shown two fibers 20 are positioned within each breakout tubing 18 and each fiber is terminated to dual fiber connectors 22, such as LC type duplex connectors, although alternatives such a SC type connector may be used. In certain examples, multiple fibers can be positioned within each breakout tubing 18, and terminated by a multi-fiber connector, such as an MPO connector.

Referring now to FIGS. 4-7, the fiber optic cable breakout assembly 10 includes a mass fusion splice between bare ribbonized fibers 20 of the example 900 mm jacketed optical cable 14. The splice of bare ribbonized fibers 20 may be designated broadly by 24 which may include a plate that helps to provide protection in the form of bend protection and/or pull protection. A bare fiber includes a glass core (e.g., about 10 microns in outer diameter for single mode fibers) surrounded by a glass cladding layer (e.g., about 125 microns in outer diameter). The cladding is surrounded by an acrylate coating layer that is typically 200-260 microns in outer diameter.

The transition body 16 of the fiber optic cable breakout assembly 10 is a tubular body that can be made from a moldable material forming an exterior surface 26. That is, the moldable material itself can be used to form the transition body 16 without any extra exterior structure or housing needed. The transition body 16 can have an inlet end 28 and an opposite outlet end 30. The transition body 16 has a generally cylindrical outer shape. The moldable material of the transition body 16 may include a two-part urethane or epoxy.

Regarding working and curing times for the epoxy, it has been found that the epoxy has a pot life, or working life/time of approximately 30-60 seconds, and the epoxy cures enough to allow subsequent processing of the fiber optic cable breakout assembly 10 in approximately 5 minutes. According to one example, the working time is less than 60 seconds. According to another example, the working time is preferably less than 30 seconds. In an example epoxy for use with the transition body 16 of the present disclosure, the surfaces thereof are no longer tacky within 10 minutes, preferably within 5 minutes.

Figure 8:
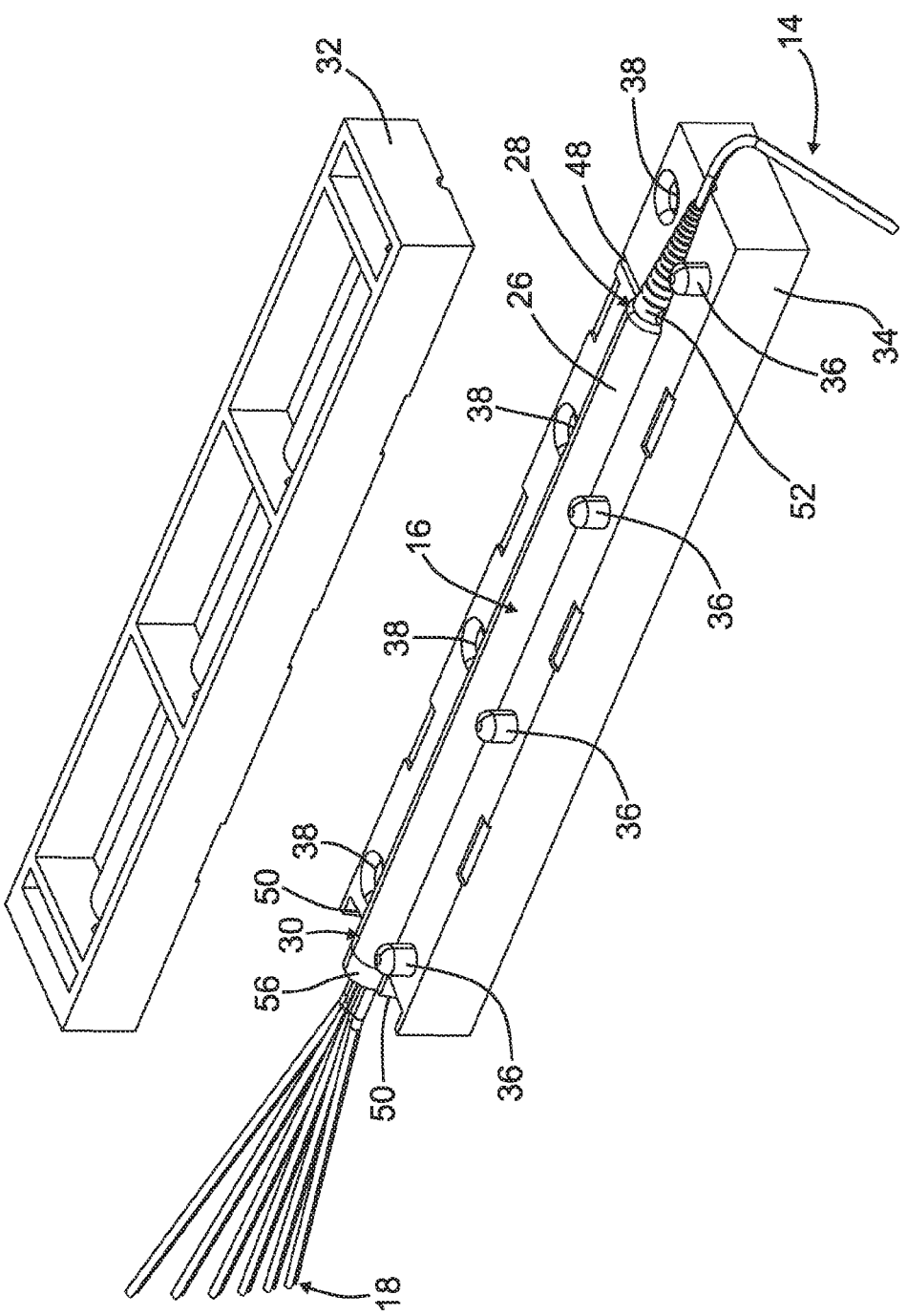
FIG. 8 is a perspective view of the molding part including first and second portions in accordance with the principles of the present disclosure.
Figure 9:
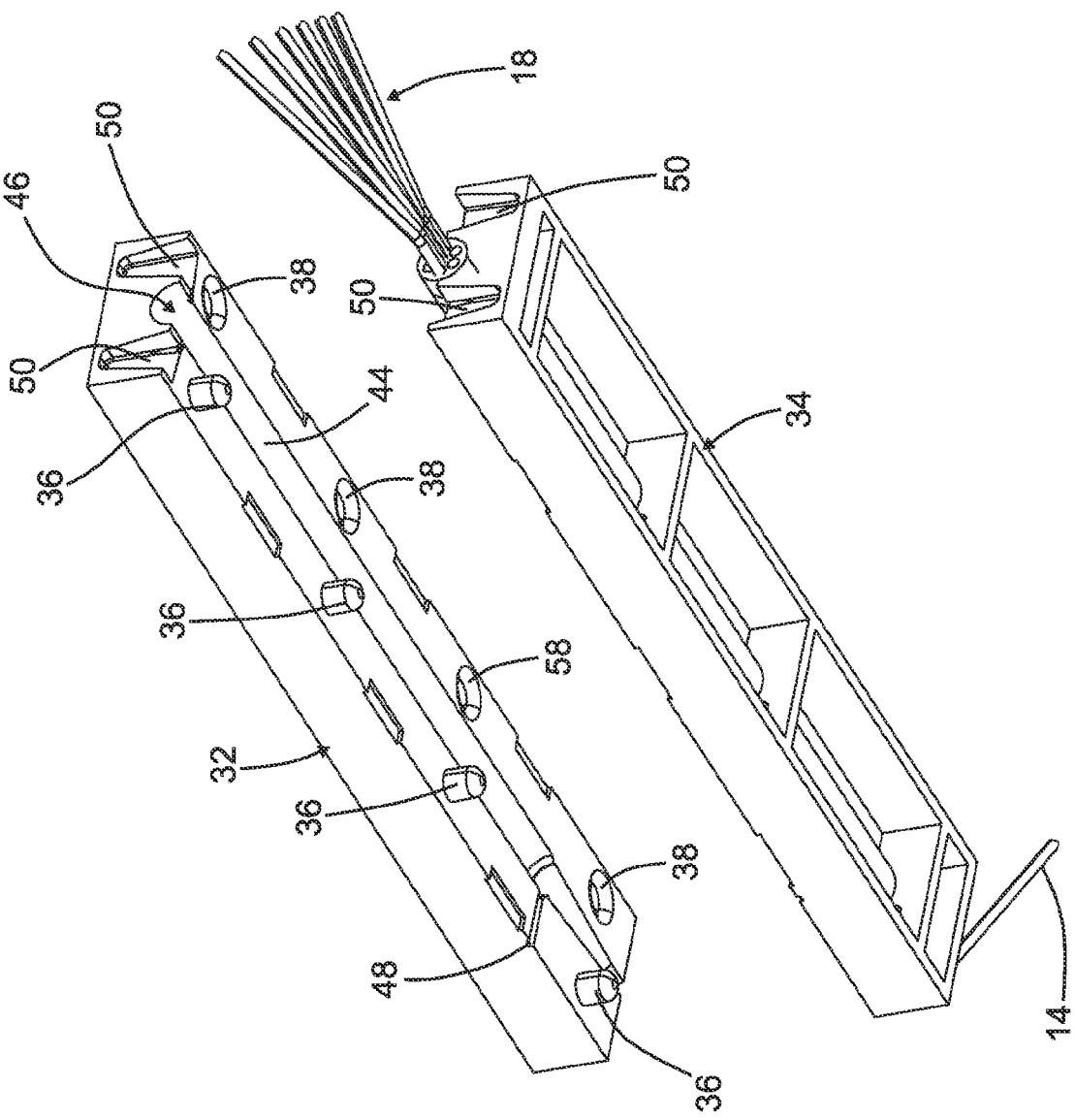
FIG. 9 is a bottom perspective view of the molding part of FIG. 8.

The transition body 16 can be formed by first and second molding parts 32, 34 (e.g., first and second halves)(see FIGS. 8-9). As shown in the figures, the first and second molding parts 32, 34 form mold portions which together form an enclosed molding area for forming the transition body 16 made from the epoxy material. The first and second molding parts 32, 34 can be used for holding parts of the assembly in the proper position prior to application of the moldable and/or curable material.

The first and second molding parts 32, 34 can be connected together by a snap-fit connection or otherwise held together to mold the moldable material into the desired shape. In certain examples, the first and second molding parts 32, 34 each include pegs 36 that are configured to engage respective openings 38 defined in the first and second molding parts 32, 34 to mount the first and second molding parts 32, 34 together. The at least one cable 14 can be positioned at the inlet end 28 of the transition body 16 and the plurality of breakout fibers 20 can be positioned at the outlet end 30 of the transition body 16.

Figure 5:
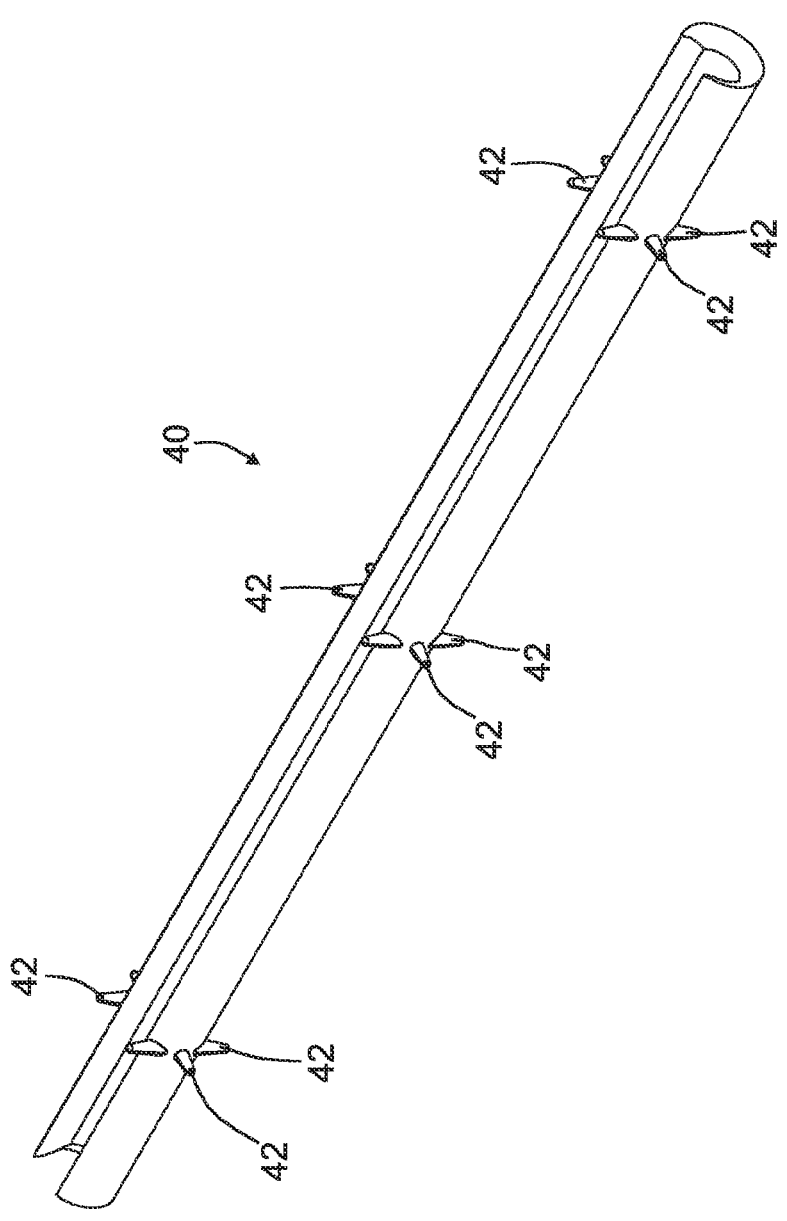
FIG. 5 is a perspective view of a centering device usable with the fiber breakout assembly of FIG. 4.
Figure 6:
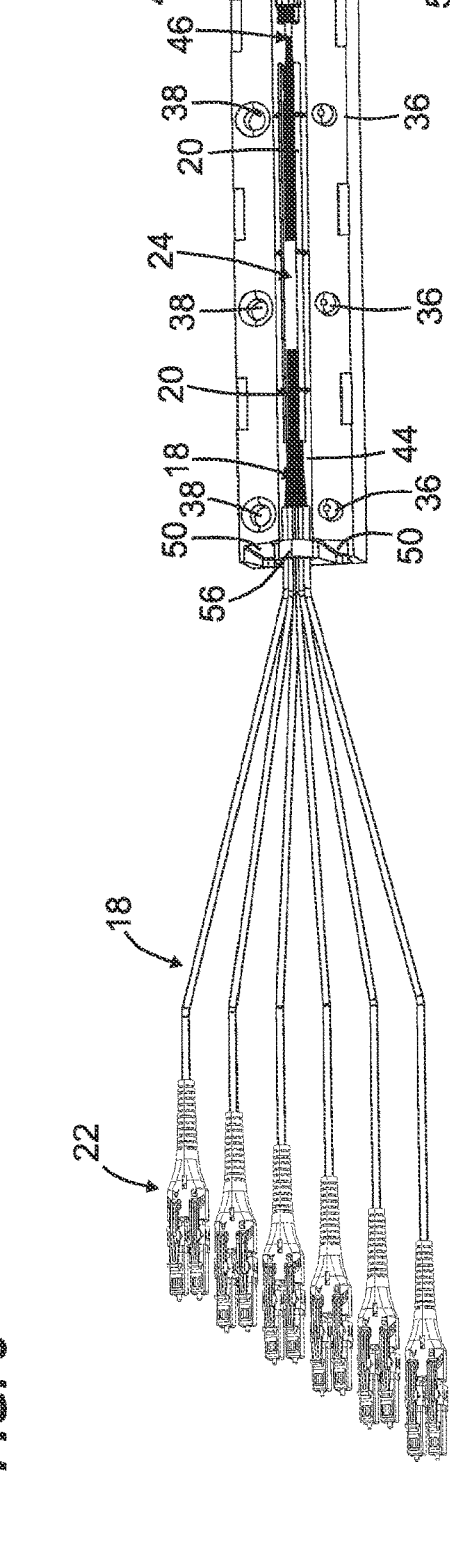
FIG. 6 is a perspective view of a first portion of the molding part including the centering device with the optical fibers and splice mounted inside in accordance with the principles of the present disclosure.
Figure 7:
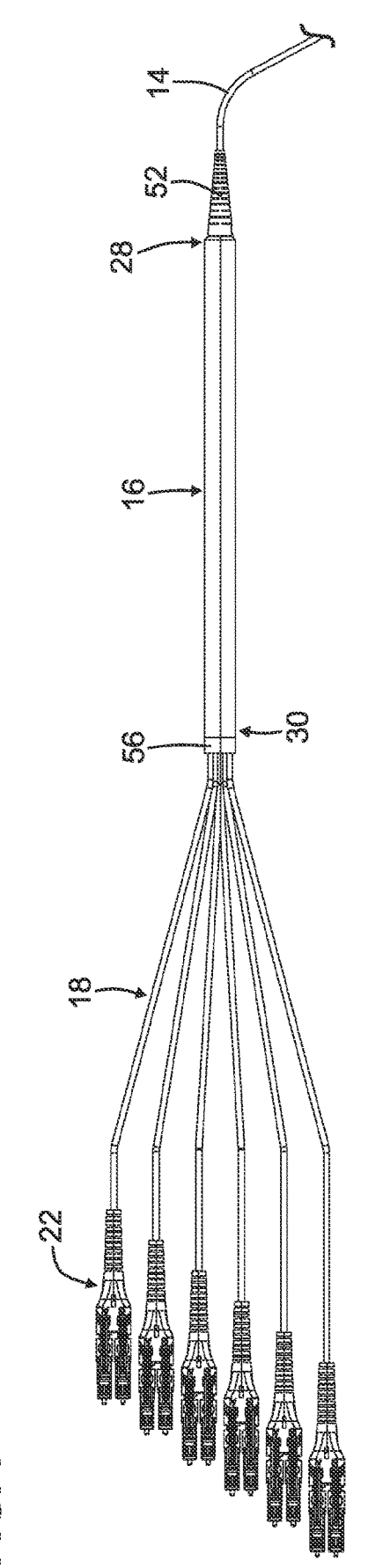
FIG. 7 is a perspective view of a transition body formed by a moldable material that includes the centering device and splice of FIG. 6 in accordance with the principles of the present disclosure.

The fiber optic cable breakout assembly 10 can include a centering element 40 (see FIG. 5). The transition body 16 can include the centering element 40 and the splice 24. The centering element 40 can be a U-shaped open sided tube made of plastic, although alternatives are possible. The centering element 40 can be positioned within the first and second molding parts 32, 34. The bare ribbonized fibers 20 and splice 24 can be positioned in the U-shaped channel of the centering element 40 to help center the splice 24 and the bare ribbonized fibers 20 within the first and second molding parts 32, 34 during the molding process. The centering element 40 includes spike members 42 that help prevent the fibers 20 from touching sides 44 of a cavity 46 of the first and second molding parts 32, 34 by providing stabilization and proper centering within the area that receives the mold-ing material.

Epoxy (or urethane or other moldable material) can be used to fill the first and second molding parts 32, 34 such that the epoxy is allowed to flow all around the splice 24, fibers 20 and the centering element 40 are encapsulated by epoxy during the molding process to form the transition body 16. The external surface 26 of the transition body 16 has a clean, smooth finish such that no external housing, enclosure, or heat shrink is needed after the mold is complete. The transition body 16 protects the exposed bare fibers associ-ated with the fibers on either side of the splice.

In certain examples, a needle or syringe may be used to inject epoxy into the first and second molding parts 32, 34 through an epoxy hole 48. In certain examples, the epoxy hole 48 of the first and second molding parts 32, 34 is positioned such that the first and second molding parts 32, 34 can be filled with epoxy in a vertical orientation from bottom-to-top, although alternatives are possible. The first and second molding parts 32, 34 can be filled with epoxy in the vertical orientation to help eliminate air bubbles. If air bubbles are trapped around the optical fibers 20, there is a risk that epoxy may not fill around the fibers 20. By positioning the first and second molding parts 32, 34 vertically during the injection of epoxy, epoxy can start to fill the first and second molding parts 32, 34 while pushing air out and epoxy fills into reservoirs 50 (see FIGS. 8-9) defined by the first and second molding parts 32, 34 adjacent the outlet end 30 (e.g., a top) of the transition body 16. The mold is filled with epoxy once the epoxy begins to enter the reservoirs 50 of the first and second molding parts 32, 34. The epoxy can collect in the reservoirs 50 such that no spillage occurs leaving nothing to clean up. Once cured, the epoxy can be broken off or otherwise removed and leave a smooth, clean finish for the transition body 16.

In certain examples, a portion of the plurality of breakout tubings 18 and the coating layer of the optical fibers 20 can also be positioned within the first and second molding parts 32, 34 to be encapsulated with epoxy. In certain examples, the transition body 16 can have a solid, rigid construction such that the splice 24 located in the transition body 16 is protected and does not bend, turn, or flex during assembly, packaging/unpacking and/or installation. The transition body 16 can be strong and narrow to allow the cable to be pulled through a conduit. The transition body 16 is also configured to prevent unintended bending or breaking of the optical fibers.

In certain examples, a strain relief boot 52 can be inserted into the first and second molding parts 32, 34 such that an anchor 54 for the strain relief boot 52 is molded with the transition body 16. That is, both the strain relief boot 52 and the anchor 54 can be inside the first and second molding parts 32, 34 such that the anchor 54 becomes encapsulated and retained by the epoxy. The strain relief boot 52 can be mounted at the inlet end 28 of the transition body 16.

Figure 10:
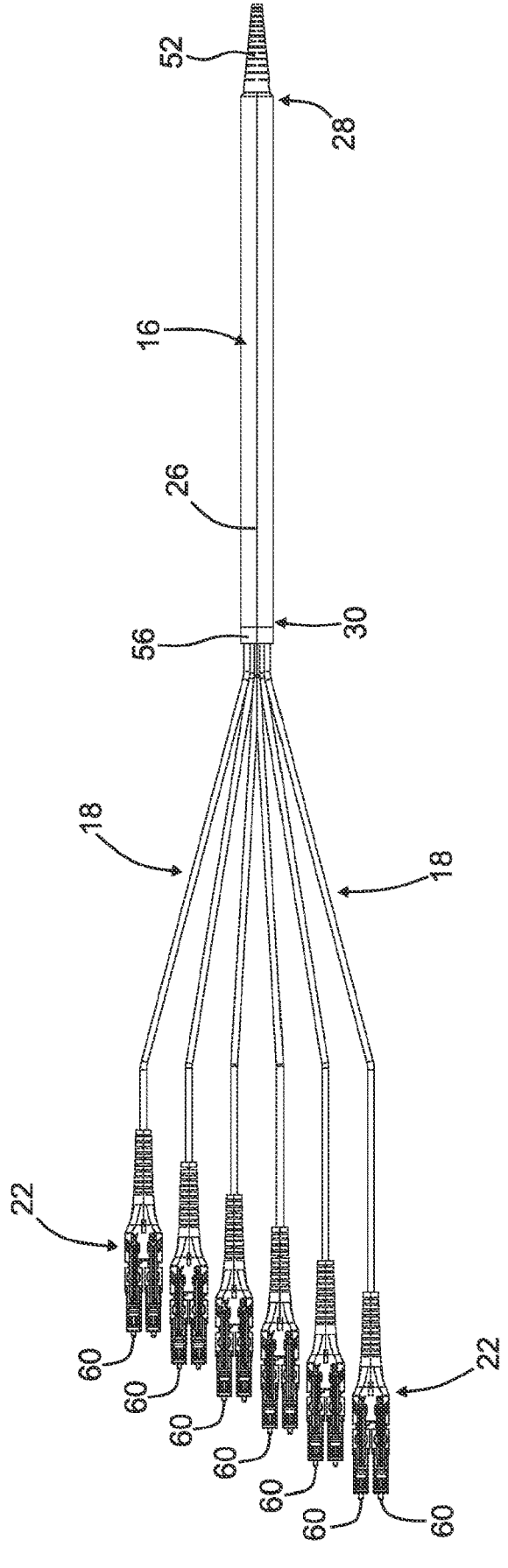
FIG. 10 is a perspective view of one of the fiber breakout assemblies of FIG. 1.
Figure 11:
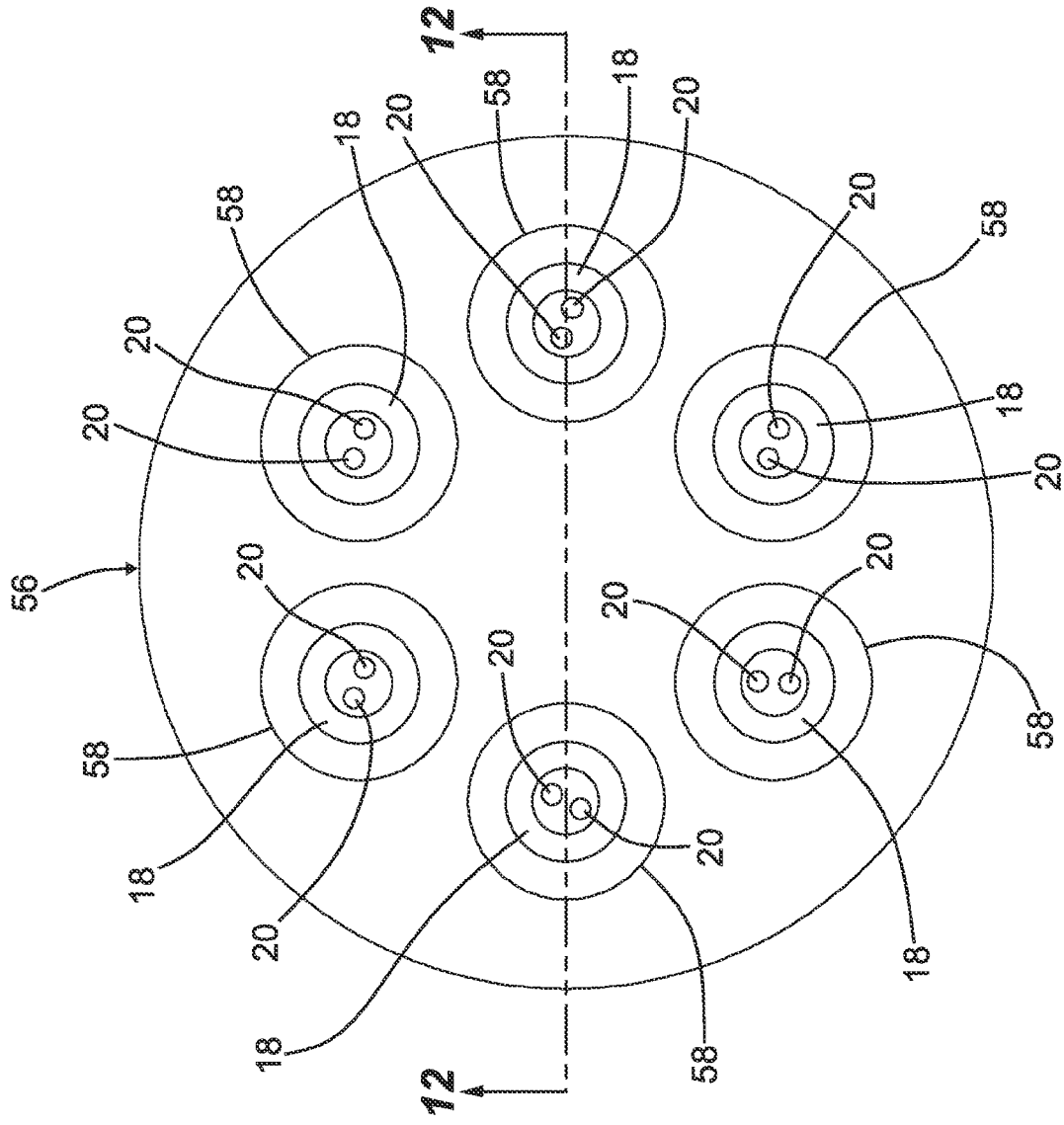
FIG. 11 is an end view of the transition body showing an endcap in accordance with the principles of the present disclosure.
Figure 12:
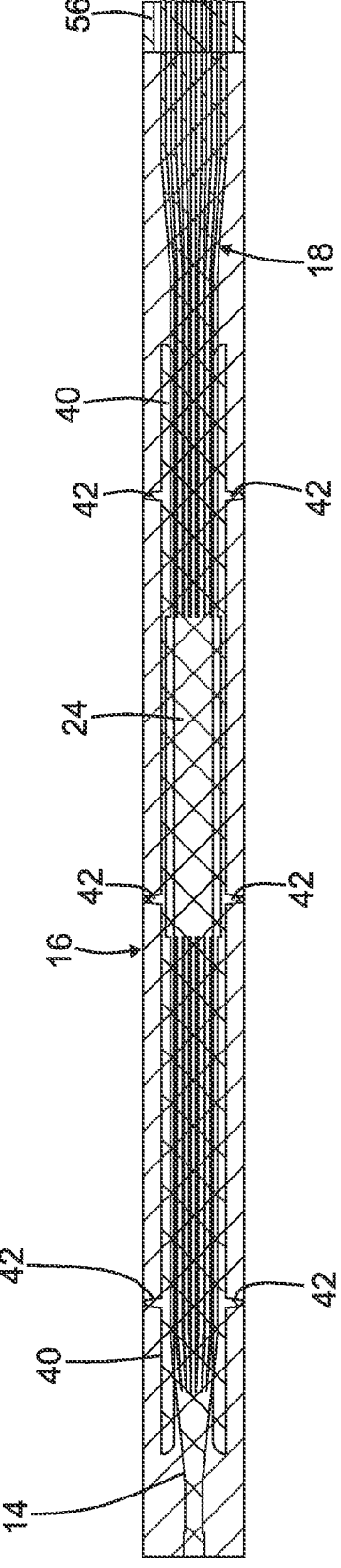
FIG. 12 is a cross-sectional view taken along line 12-12 of FIG. 11, showing the end cap, the centering device, the splice, and the optical fibers.

Turning to FIGS. 10-12, the fiber optic cable breakout assembly 10 can include an endcap 56 positioned between the reservoirs 50 adjacent the outlet end 30 of the transition body 16. The endcap 56 can be used to organize the plurality of breakout tubings 18. The endcap 56 forms and end of the transition body 16. That is, the endcap 56 can be molded with the transition body 16, although alternatives are possible. The endcap 56 defines a plurality of openings 58 for receiving the plurality of breakout tubings 18. In certain examples, epoxy can be introduced into openings 58 so that epoxy secures the plurality of breakout tubings 18, and yarns, within the endcap 56. As such, no extra support or fixation is needed between the endcap 56 and the transition body 16. Each of the plurality of breakout tubings 18 includes two optical fibers 60 that terminate in 12 LC type duplex connectors 22.

FIGS. 1-12 show various parts of one example of a cable assembly. Depending on how many fibers are desired, and the purpose, the cable assembly can include different arrangements. Different connectors 22, different numbers of fibers in each cable 14, and different numbers of cables 14 are possible. Transition body 16 allows for protection of the inner fibers and the splice, and can be located in small spaces. One such small space is inside a duct when the cable assembly can be pulled through from one location to another. If the cable assembly includes multiple transition body, the transitions bodies can be staggered as the cable assembly is pulled through the duct.

Figure 13:
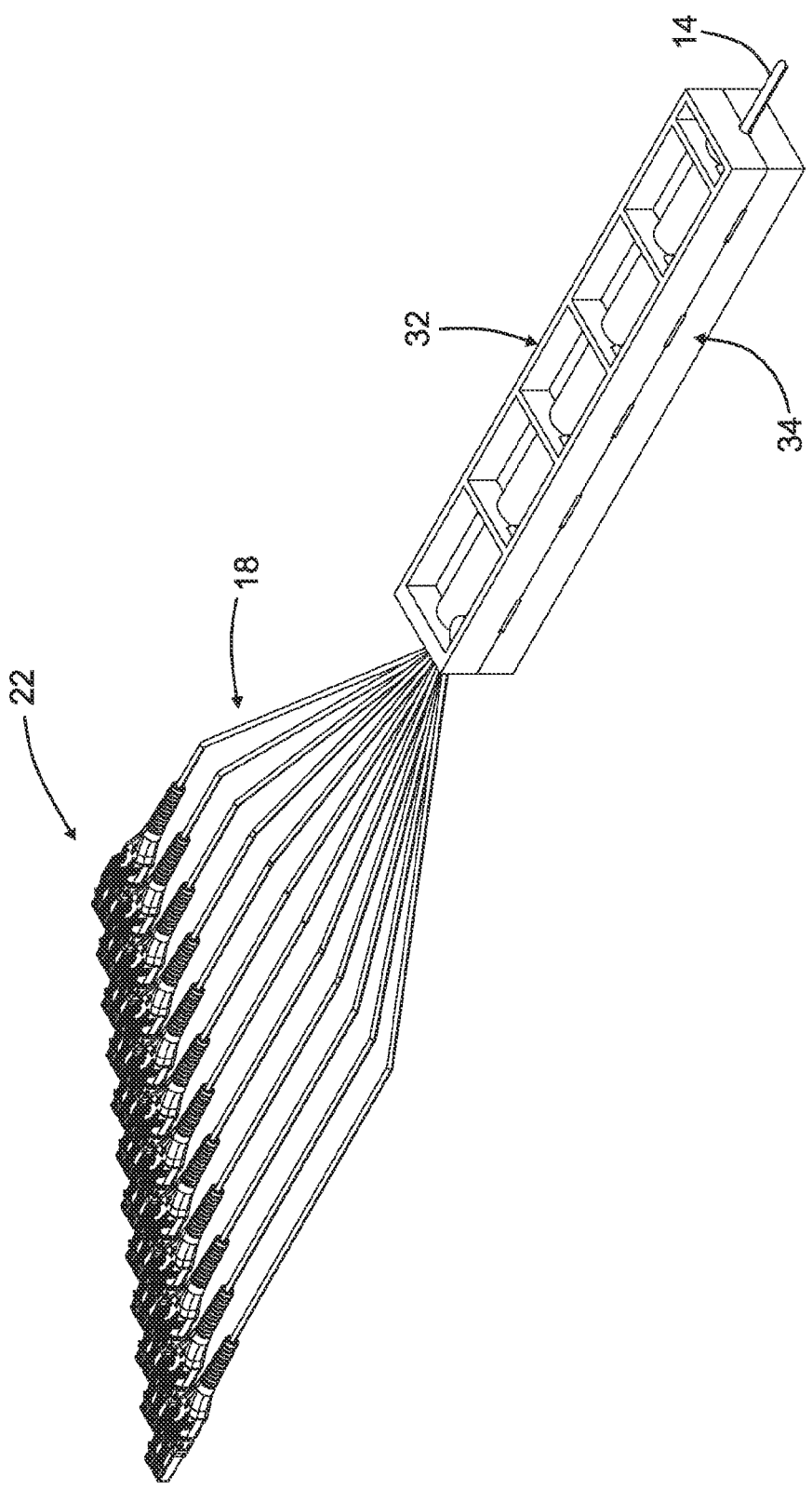
FIG. 13 is a perspective view of a second embodiment of a cable breakout assembly showing twelve connectors.
Figure 14:
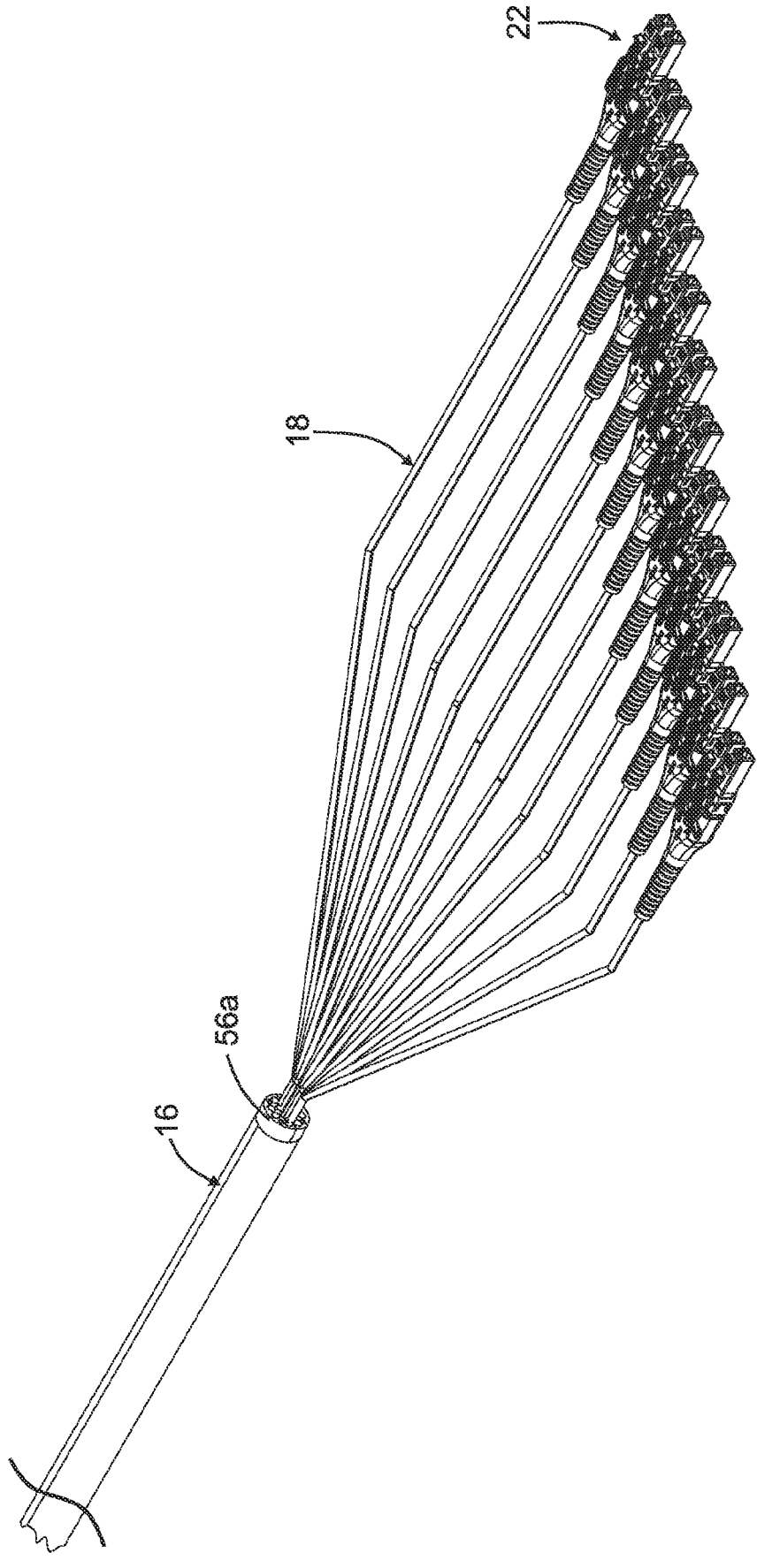
FIG. 14 is another perspective view of the second embodiment of FIG. 13 showing the transition body.

In certain examples, twelve breakout tubings 18 (see FIGS. 13-14) may be terminated into 24 LC type connectors in accordance with the principles of the present disclosure.

As such, the endcap 56a may define twelve openings 58 to receive the breakout tubings 18.

Figure 15:
FIG. 15 is a perspective view showing two cable breakout assemblies.
Figure 16:
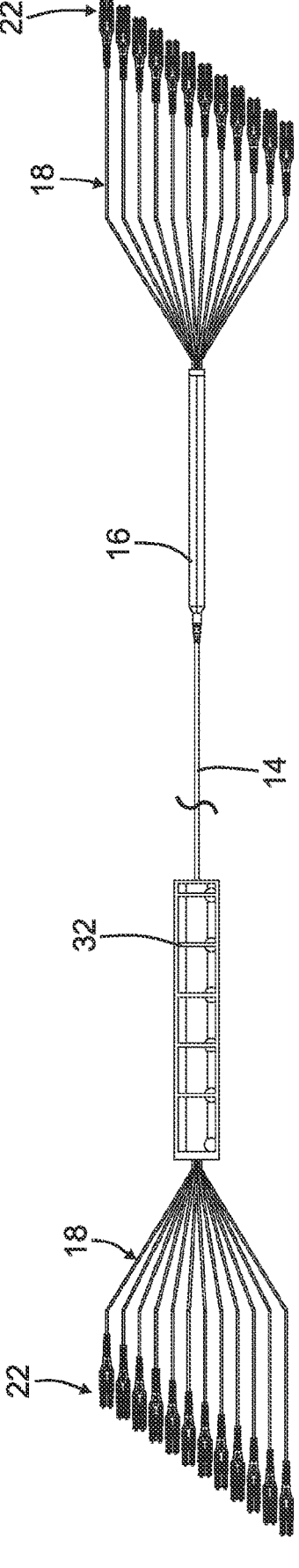
FIG. 16 is another perspective view of the cable breakout assemblies of FIG. 15.

Referring to FIGS. 15-16, a fiber optic cable may include more than one transition to provide multiple breakout tubings on both ends of the cable in accordance with the principles of the present disclosure.

Different molds can be provided to change a length and/or a diameter of a transition body 16 if desired.

Figure 17:
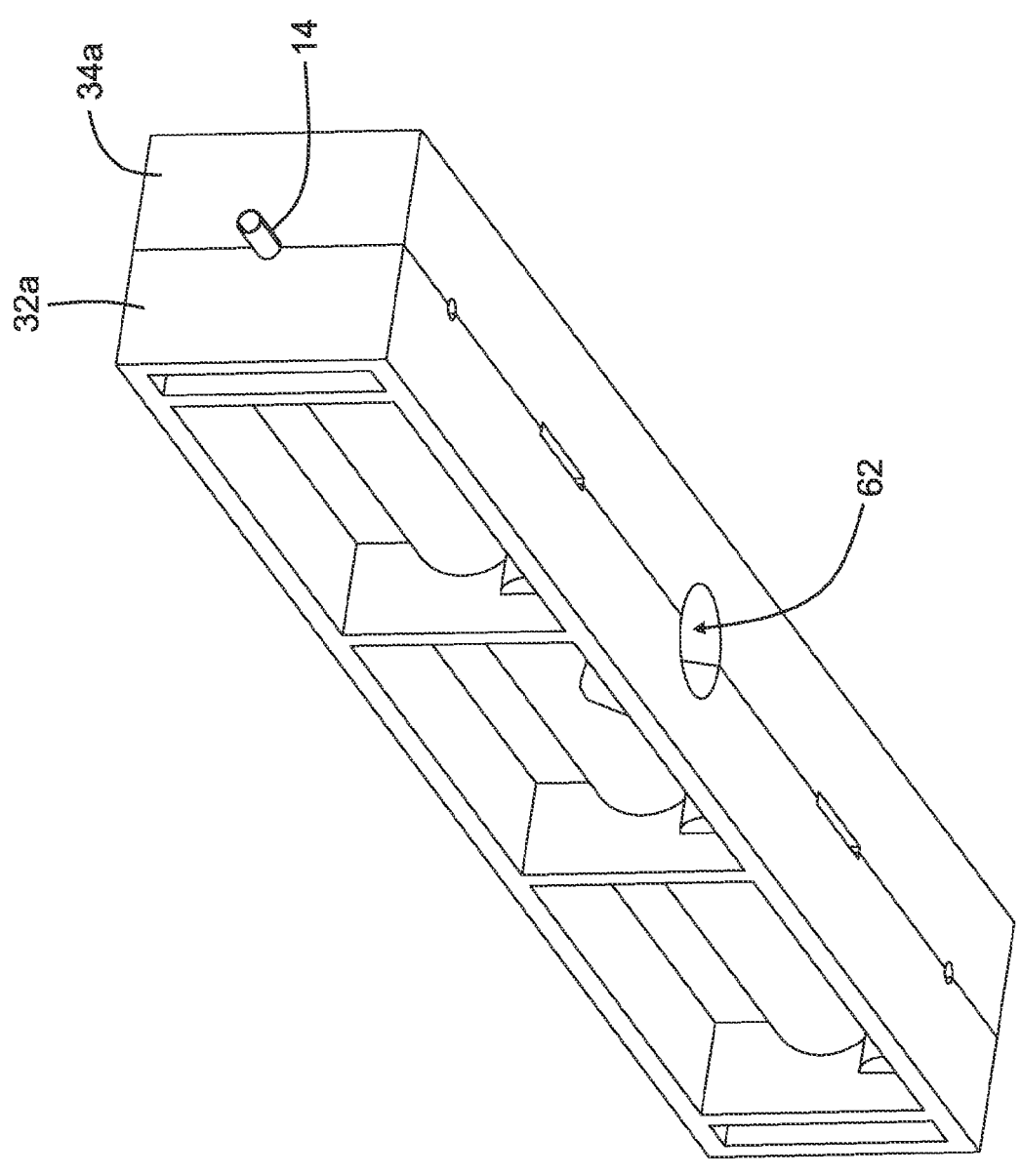
FIG. 17 is a perspective view showing another example molding part including a center hole for inserting a hot melt for molding a transition body in accordance with the principles of the present disclosure.
Figure 18:
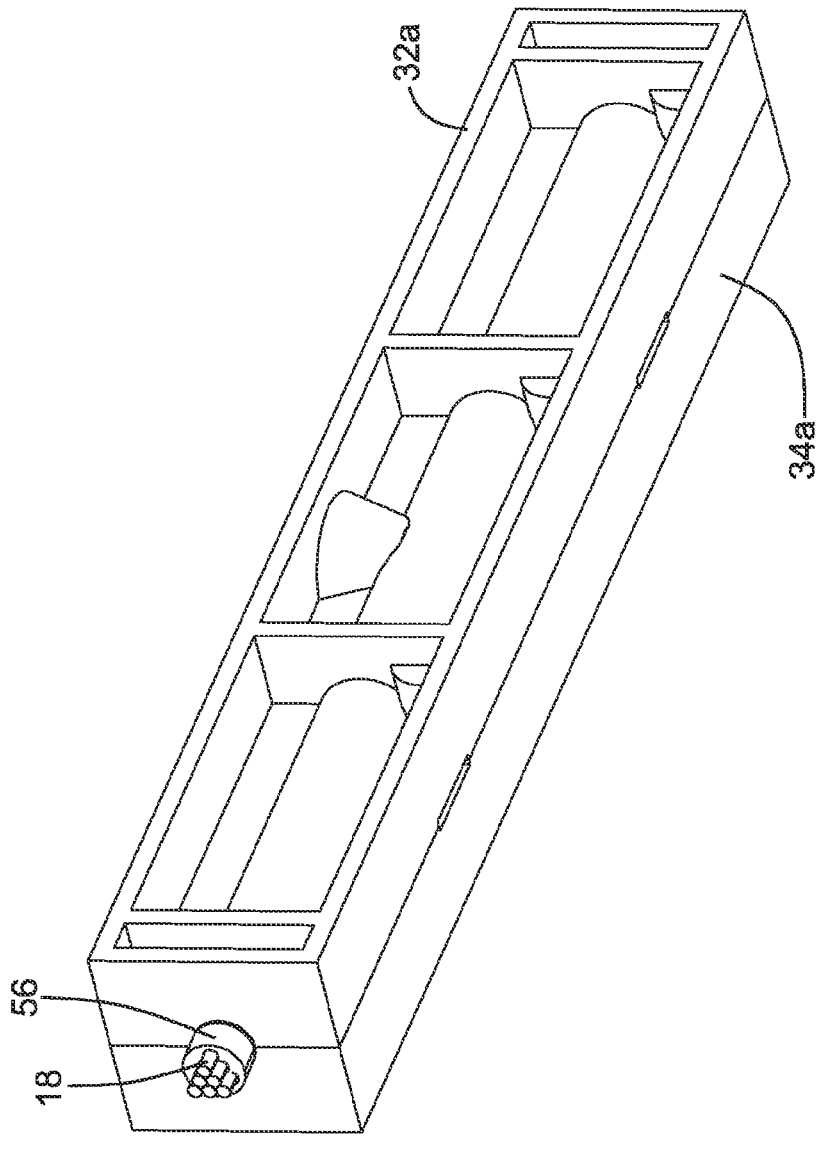
FIG. 18 is another perspective view of the molding part of FIG. 17.
Figure 19:
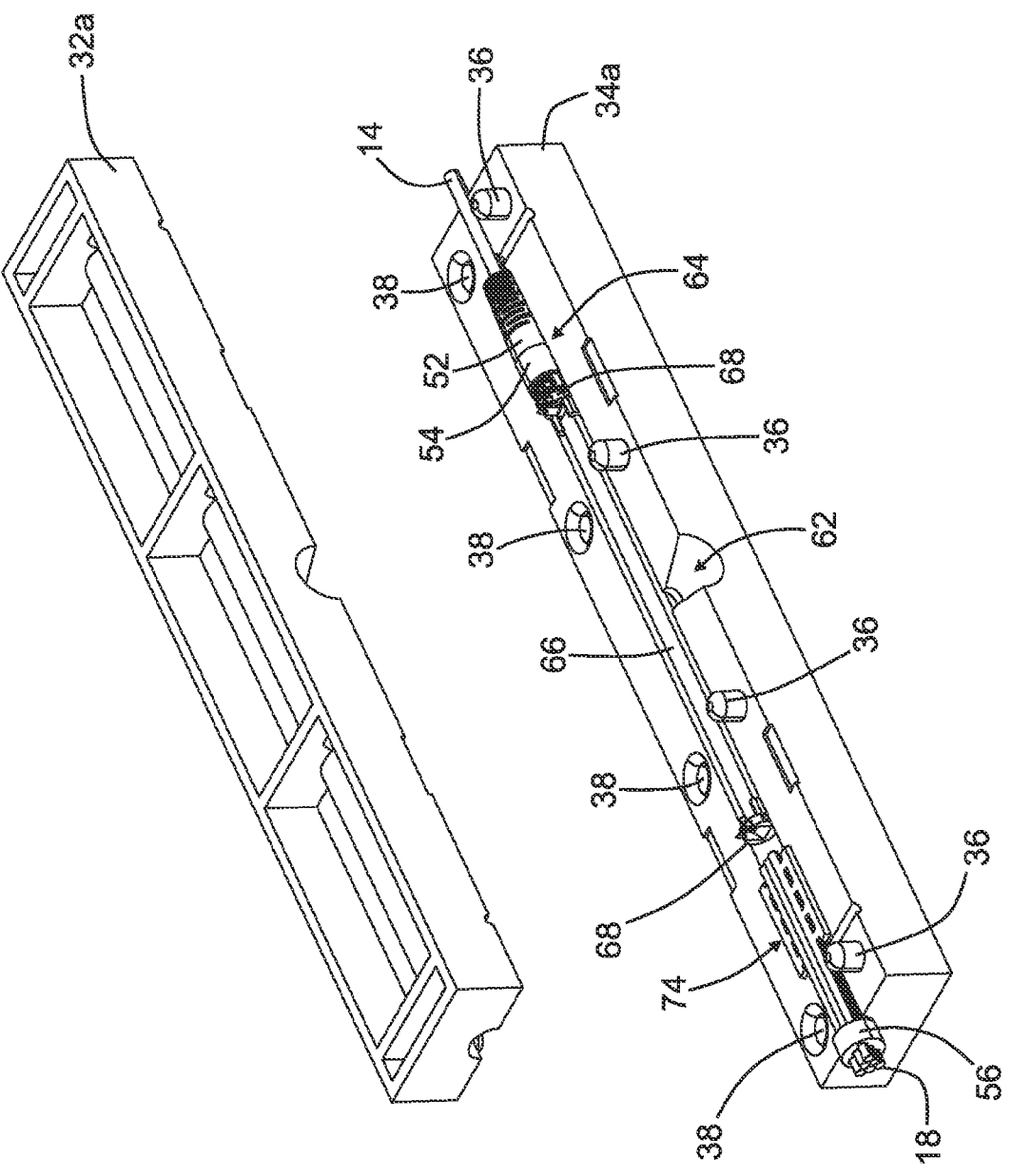
FIG. 19 is an exploded view of the molding part of FIG. 17 showing another example cable breakout assembly in accordance with the principles of the present disclosure.

Referring now to FIGS. 17-18, another example mold is depicted for use with another fiber optic cable breakout assembly 10a as shown in FIGS. 19-22 in accordance with the principles of the present disclosure.

The first and second molding parts 32a, 34a have a center fill hole 62 for receiving a hot melt adhesive. In certain examples, a hot glue gun can be used to inject the hot melt through the center hole 62 such that the hot melt flows in both directions. That is, the hot melt can flow from the center to both ends of the first and second molding parts 32a, 34a to form a transition body. The hot melt transition body can be possibly more flexible and/or bendable than one made from epoxy or urethane. The first and second molding parts 32a, 34a can include a receptacle 64 for forming a boot 52 at the inlet end 28 of the transition body.

In some examples, the boot 52 can be molded at the same time with the transition body, with the same moldable material.

In certain examples a boot forming portion 72 can be defined in a mold as depicted in the second molding part 34a. When hot melt is inserted through the center hole 62 a boot can be formed at the outlet end 30 of the transition body as shown in FIG. 21.

Figures 20, 21:
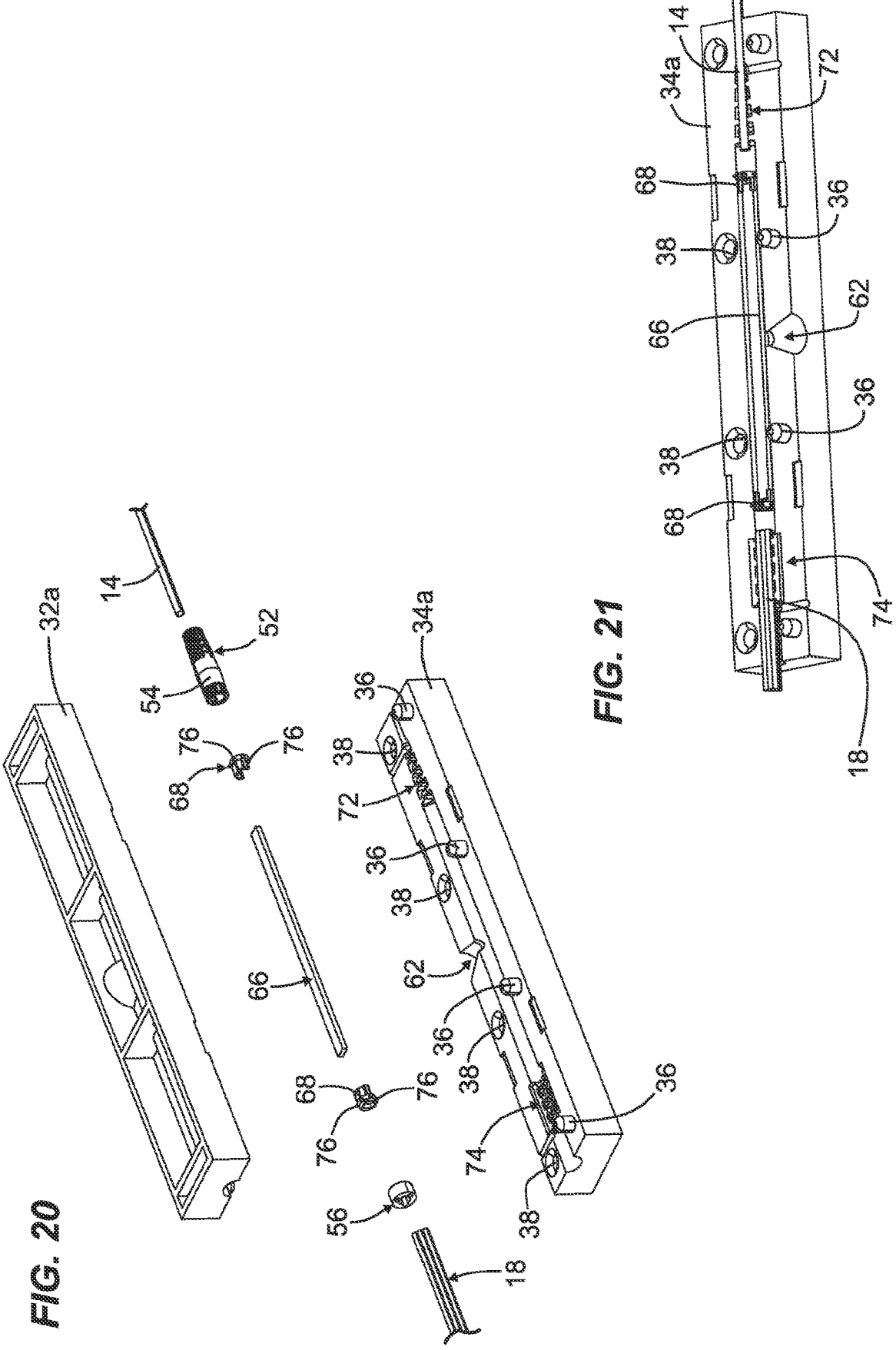
FIG. 20 is an exploded perspective view of the cable breakout assembly of FIG. 19.
FIG. 21 is a perspective view of one of the molding parts of FIG. 20.

FIG. 21 also shows the breakout tubings 18 held within a comb holder 74 that can be configured as part of the second molding part 34a. While in the comb holder 74, a portion of the breakout tubings 18 can be encapsulated by the hot melt as part of the hot melt transmission body. The breakout tubings 18 can pass from the comb holder 74 through the endcap 56.

Turning again to FIGS. 19-22, a bar member 66 can be positioned inside the first and second molding parts 32a, 34a. The hot melt can flow around the bar member 66 such that the bar member 66 becomes part of the hot melt transition body. In certain examples, the bar member 66 may be made of metal or have a metal portion, such as, but not limited to, aluminum.

The fiber optic cable breakout assembly 10a can include endcaps 68 at opposing ends of the hot melt transition body. The endcaps 68 can include spiked members 76 to help keep the fibers and the splice centered in the first and second molding parts 32a, 34a while allowing the hot-melt material to flow all around. As such, the spiked endcaps 68 can become fixed by the hot melt to the holt melt transition body as a permanent feature of the finished transition.

Figure 22:
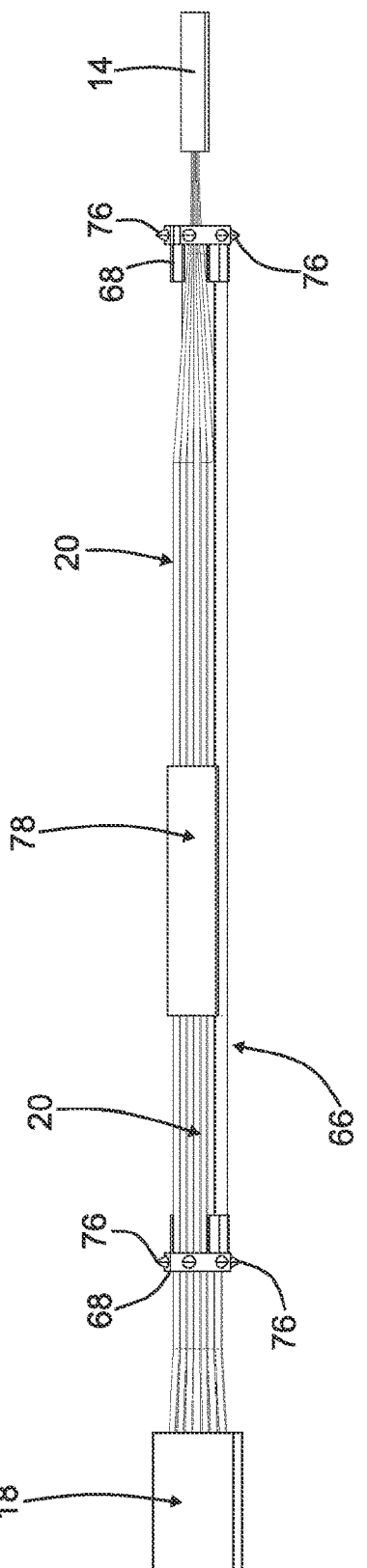
FIG. 22 is a perspective view of a splice protector for use with the cable breakout assembly of FIG. 20 in accordance with the principles of the present disclosure.

Turning to FIG. 22, a splice protector 78 is shown can be used to protect a splice of bare fibers. The splice protector 78 can include a laminate that is flexible. To add rigidness, the splice protector 78 can be placed on the bar member 66 for additional support. The splice protector 78 can be encapsulated with the hot melt adhesive while positioned on the bar member 66 to become part of the hot melt transition body. The bar member 66 helps to reduce bending/flexing of the splice protector 78 to protect the spliced bare fibers.

It will be appreciated that the length of the bar member 66 can vary such that portions of the hot melt transition body can be more flexible along its length. In certain examples, the bar member 66 may have a length as short as the splice protector 78 to provide rigidity to only the splice area covered by the splice protector 78 to prevent bending/flexing. The remaining length of the hot melt transition body that does not include the bar member 66 can be flexible. In certain examples, a length of the bar member 66 can be longer as shown to make the entire hot melt transition body rigid.

Another aspect of the present disclosure relates to a method of making the fiber optic cable breakout assembly. The method can include providing a mold which allows the at least one cable and the plurality of breakout fibers to pass therethrough; inserting the centering device and the internal splice into the mold; and filling the mold with a moldable and/or curable material to surround the centering device, the internal splice, and the plurality of breakout fibers passing through the transition body.

In certain examples, the method can also include a step of passing the plurality of breakout fibers through a plurality of breakout tubings.

In certain examples, the method can include a step of orienting the mold in a vertical orientation prior to inserting the moldable and/or curable material.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic cable breakout assembly comprising:
a cylindrical transition body made from a one-piece moldable material forming an exterior surface of the fiber optic cable breakout assembly, the transition body having an inlet end and an opposite outlet end;
at least one cable at the inlet end of the transition body, the at least one cable having a plurality of fibers;
a plurality of breakout fibers at the outlet end of the transition body, wherein the plurality of breakout fibers pass through a plurality of breakout tubings, each breakout tubing of the plurality of breakout tubings including a fiber optic connector at a distal of each breakout tubing;
a centering element positioned within the transition body, the centering element holding the at least one cable and the plurality of breakout fibers relative to the transition body, wherein the at least one cable and the plurality of breakout fibers are centered cylindrically in a longitudinal direction by the centering element; and
an internal splice positioned inside the centering element to splice the plurality of breakout fibers to the plurality of fibers of the at least one cable;
wherein the internal splice is positioned in a channel of the centering element;
wherein the internal splice is centered cylindrically by the centering element;
wherein the centering element, the internal splice positioned inside the channel of the centering element, the plurality of breakout fibers held by the centering element, and the at least one cable held by the centering element, are encapsulated by the moldable material of the transition body;
an endcap positioned at the outlet end of the transition body, the endcap defining a plurality of openings for receiving the plurality of breakout tubings a boot positioned at the inlet end of the transition body.

2. The fiber optic cable breakout assembly of claim 1, wherein the centering element includes spike members to provide stabilization during molding of the transition body.

3. The fiber optic cable breakout assembly of claim 1, wherein the boot is integrally molded with the transition body.

4. A method of making a transition body for protecting optical fibers and a splice comprising:
providing a multi-fiber jacketed cable with a splice to broken out fibers of the cable, one or more of the broken out fibers positioned in each one of a plurality of breakout tubings, each breakout tubing of the plurality of breakout tubings including a fiber optic connector at a distal of each breakout tubing;
positioning a centering device within a first mold portion;
positioning the splice into a channel of the centering device by routing an end of a jacket of the multi-fiber jacketed cable into the centering device at a first end and positioning the broken out fibers from the cable into the centering device through a second end;
passing the breakout tubings through openings in a cap positioned in the first mold portion;
positioning a boot in the first mold portion at an opposite end of the first mold portion from the cap;
mounting a second mold portion to the first mold portion to form an enclosed molding area;
applying moldable material into the molding area over the centering device, the end of the jacket, the splice, and the broken out fibers;
curing the moldable material to form a cured transition body; and
removing the first mold portion and the second mold portion from the cured transition body.

5. The method of claim 4, wherein the step of applying the moldable material includes orienting the first and second mold portions in a vertical orientation.

6. The method of claim 4, wherein the moldable material is applied until reservoirs of the first and second mold portions are filled.

7. A method of making a transition body for protecting optical fibers and a splice comprising:
providing a multi-fiber jacketed cable with a splice to broken out fibers of the cable, one or more of the broken out fibers positioned in each one of a plurality of breakout tubings, each breakout tubing of the plurality of breakout tubings including a fiber optic connector at a distal of each breakout tubing;
positioning a centering device within a first mold portion, the first mold portion defining a boot molding portion at a first end;
positioning the splice into a channel of the centering device by routing an end of a jacket of the multi-fiber jacketed cable into the centering device at a first end and positioning the broken out fibers from the cable into the centering device through a second end;
passing the breakout tubings through openings in a cap positioned in the first mold portion at a second end opposite the first end;
mounting a second mold portion to the first mold portion to form an enclosed molding area, the second mold portion defining a boot molding portion at a first end;
applying moldable material into the molding area over the centering device, the end of the jacket, the splice, and the broken out fibers;
curing the moldable material to form a cured transition body including an integral boot; and
removing the first mold portion and the second mold portion from the cured transition body.

* * * * *